US008660149B2

(12) United States Patent
Ando et al.

(10) Patent No.: US 8,660,149 B2
(45) Date of Patent: Feb. 25, 2014

(54) DATA COMMUNICATION NETWORK SYSTEM

(75) Inventors: Hiroya Ando, Toyota (JP); Hiroyoshi Ito, Toyota (JP); Kengo Hayashizaki, Okazaki (JP); Koji Hirabayashi, Miyoshi (JP); Nobuyuki Nakagawa, Miyoshi (JP); Yusuke Satoh, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 378 days.

(21) Appl. No.: 12/957,849

(22) Filed: Dec. 1, 2010

(65) Prior Publication Data

US 2011/0128855 A1 Jun. 2, 2011

Related U.S. Application Data

(63) Continuation of application No. PCT/JP2009/006536, filed on Dec. 2, 2009.

(51) Int. Cl.
 *H04J 3/06* (2006.01)
(52) U.S. Cl.
 USPC ......................................... 370/503
(58) Field of Classification Search
 USPC .......... 370/350, 503, 507–514; 709/208, 223, 709/225, 227, 229
 See application file for complete search history.

(56) References Cited

U.S. PATENT DOCUMENTS

| 5,517,499 | A | * | 5/1996 | Gauffin et al. | ............... | 370/503 |
| 5,951,683 | A | * | 9/1999 | Yuuki et al. | ..................... | 713/1 |
| 6,990,540 | B2 | * | 1/2006 | Dalakuras et al. | ........... | 710/110 |
| 7,486,647 | B2 | * | 2/2009 | Schrader et al. | ............. | 370/337 |
| 7,826,492 | B2 | * | 11/2010 | Takeuchi | ..................... | 370/509 |

FOREIGN PATENT DOCUMENTS

| EP | 1355456 A1 | 10/2003 |
| JP | 7-84943 A | 3/1995 |
| JP | 11-261581 A | 9/1999 |
| JP | 2007-60400 A | 3/2007 |
| JP | 2008-277873 A | 11/2008 |
| JP | 2008-306648 A | 12/2008 |
| JP | 2009-089166 A | 4/2009 |

* cited by examiner

*Primary Examiner* — Kwang B Yao
*Assistant Examiner* — Juvena Loo
(74) *Attorney, Agent, or Firm* — Kenyon & Kenyon LLP

(57) ABSTRACT

A data communication network system which enables an intended unit to determine a start point for a transmission schedule in communication is provided.
In a data communication network system in which a plurality of electronic control units perform network communication through a communication line based on a time triggered communication protocol, a control section for previously putting the communication line in a communication inhibited state, and canceling the communication inhibited state at a predetermined time is included, and a predetermined one unit among the plurality of electronic control units transmits a message for synchronization, in a communication time, with the other units thereamong immediately after the communication inhibited state is cancelled.

5 Claims, 6 Drawing Sheets

DATA COMMUNICATION NETWORK SYSTEM

TECHNICAL FIELD

The present invention relates to a data communication network system.

BACKGROUND ART

Conventionally, a data communication network system in which a plurality of terminals perform frame transmission and reception through a transmission line has been used. For example, as typified by recently used vehicles, increase of electronic control units (ECUs) mounted in the vehicles leads to advance in networking for communication. For example, a CAN (Controller Area Network) has been used for control system network, and a LIN (Local Interconnect Network) has been used for a body system.

Further, such an in-vehicle LAN (Local Area Network) is required to accurately control transmission timing. In response to the demand, for example, a communication timing control method as disclosed in Patent Literature 1 is used.

CITATION LIST

Patent Literature
Patent Literature 1: Japanese Laid-Open Patent Publication No. 2007-060400

SUMMARY OF THE INVENTION

Problems to be Solved by the Invention

In the control method disclosed in Patent Literature 1, an in-vehicle LAN for connecting a plurality of communication control units with each other via an in-vehicle LAN network is used, and each communication control unit includes a time measurement section. In the control method disclosed in Patent Literature 1, one of the communication control units connected via the in-vehicle LAN network is caused to transmit synchronization data, such that the time measurement sections of the communication control units are synchronized with each other in accordance with the synchronization data being received by the communication control units, respectively.

However, in the control method disclosed in Patent Literature 1, a unit which needs to determine a start point for a transmission schedule cannot necessarily determine the start point. Therefore, there is a problem that, when another unit determines the start point, the unit which needs to determine the start point for the transmission schedule cannot transmit data at its intended time.

The present invention is made in order to solve the aforementioned problems, and an object of the present invention is to provide a data communication network system which enables an intended unit to determine a start point for a transmission schedule of a communication.

Solution to the Problems

The present invention has the following features in order to solve the aforementioned problems. Specifically, a first aspect of the present invention is directed to a data communication network system in which a plurality of electronic control units perform network communication through a communication line based on a time triggered communication protocol. The data communication network system includes a control section for previously putting the communication line in a communication inhibited state, and canceling the communication inhibited state at a predetermined time. Further, a predetermined one unit among the plurality of electronic control units transmits a message for synchronization, in a communication time, with the other units thereamong immediately after the communication inhibited state is cancelled.

In a second aspect of the present invention based on the first aspect, the network communication is connected to another network communication via a gateway, and the control section cancels the communication inhibited state based on a transmission and reception cycle defined for the another network communication.

In a third aspect of the present invention based on the first aspect, the control section puts the communication line in the communication inhibited state when the plurality of electronic control units end communication.

In a fourth aspect of the present invention based on the first aspect, the control section sets the communication inhibited state by applying a predetermined voltage to the communication line.

In a fifth aspect of the present invention based on the first aspect, the control section is mounted in the predetermined one unit among the plurality of electronic control units.

Advantageous Effects of the Invention

According to the first aspect, for example, a node, among a plurality of nodes connected to a data communication network, which needs to determine a start point for a transmission schedule can determine the start point for the transmission schedule, thereby starting a communication at its intended time.

According to the second aspect, for example, when a message needs to be relayed by the gateway ECU from the first network to the second network, the message can be relayed by the gateway ECU from the first network to the second network without retaining the message in the gateway ECU 50.

According to the third aspect, when the plurality of electronic control units end communication, the communication line is put in the communication inhibited state, thereby starting communication at an intended time when the communication is started.

According to the fourth aspect, a simple method in which a predetermined voltage is applied to the communication line is used to set the communication inhibited state. Further, the communication inhibited state can be set for various communication protocols by changing the applied voltage.

According to the fifth aspect, the control section is mounted in the predetermined one unit among the plurality of electronic control units. Therefore, it is unnecessary to separately provide the control section and/or the communication line, which is advantageous in cost, and can realize reduction in space.

DESCRIPTION OF EMBODIMENTS

Hereinafter, a data communication network system according to an embodiment of the present invention will be described with reference to the drawings. In the present embodiment, an exemplary case in which the data communication network system of the present invention is mounted in a vehicle is assumed.

Initially, prior to description of an embodiment of the present invention, an outline of the present invention will be described. In the following description, a communication protocol based on a time triggered communication procedure, specifically, the FlexRay (registered trademark) protocol will be taken as an example.

In a data communication network in which the communication protocol based on a time triggered communication procedure is used, a node which can become ready for transmission of a start-up frame, earliest of a plurality of cold start nodes, acts as a preceding cold start node. For the other nodes which are connected to the data communication network, a start point for a transmission schedule is determined by the preceding cold start node. Therefore, for example, even when a certain node included in a plurality of nodes connected to the data communication network needs to determine a start point for the transmission schedule, the node cannot always determine the start point for the transmission schedule.

Therefore, in the data communication network system according to the present embodiment, a node which needs to determine a start point for the transmission schedule includes a control section capable of putting a communication line of the network in a communication inhibited state. When the node which needs to determine the start point for the transmission schedule enters a communication enabled state, the control section cancels the communication inhibited state of the communication line of the network. Thus, for example, a node which is included in a plurality of nodes connected to the data communication network and which needs to determine a start point for the transmission schedule, is allowed to determine the start point for the transmission schedule, so that the communication can be started at its intended time.

Figure 1:
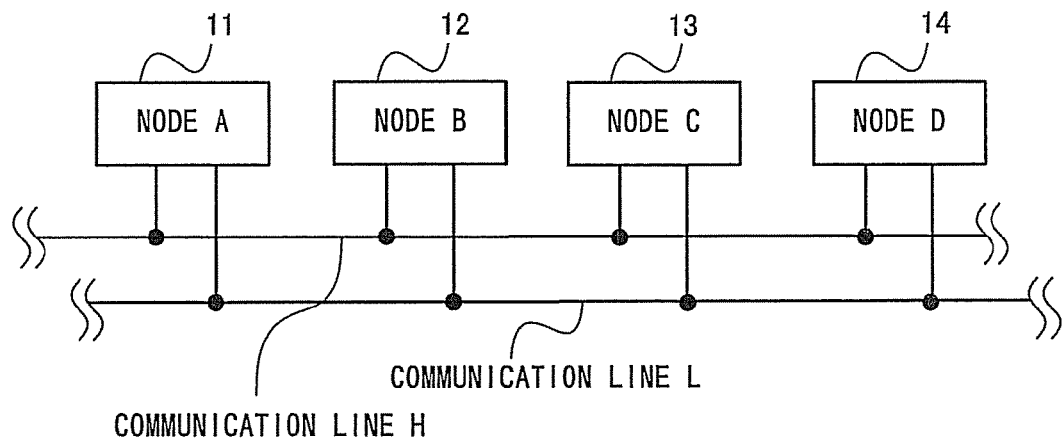
FIG. 1 is a diagram illustrating an exemplary data communication network used for describing an outline of the present invention.

For example, FIG. 1 shows an exemplary data communication network of a bus topology in which a node A11, a node B12, a node C13, and a node D14 are connected to the communication line H and the communication line L so as to share the communication lines H and L. For example, it is assumed that, in the data communication network shown in FIG. 1, a node which needs to determine a start point for a transmission schedule based on its own time is the node A11. As will be described below in detail, in the data communication network system according to the present embodiment, for example, the node A11 includes the control section, and the control section applies predetermined voltages to the communication line H and the communication line L, respectively, to prevent the other nodes (the node B12, the node C13, and the node D14 in the example shown in FIG. 1) from starting communication. The application of the voltages to the communication line H and the communication line L is cancelled at a predetermined time. Thus, a start point for a transmission schedule can be determined based on its own time (the time of the node A11).

Next, a general description of a communication system on which the present invention is based will be given with reference to the drawings.

For example, in the data communication network system illustrated in FIG. 1, a time division multiplex communication system is used by each of the node A11, the node B12, the node C13, and the node D14, to make communication among the nodes. Specifically, for the data communication network system illustrated in FIG. 1, a communication protocol based on a time triggered communication procedure is used. Examples of a communication protocol for the data communication network system according to the present embodiment include the FlexRay (registered trademark) protocol.

A communication protocol for the data communication network system according to the present embodiment will be described below by using, as an example, the FlexRay (registered trademark) protocol. The FlexRay (registered trademark) protocol is a known technique. Therefore, matters which are directly associated with the present embodiment will be described, and matters which are not directly associated with the present embodiment are not described.

Figure 2:
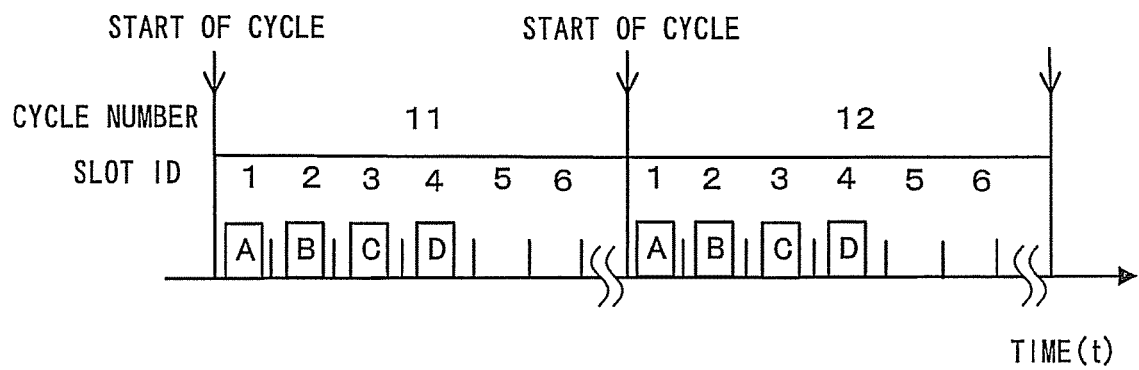
FIG. 2 is a diagram illustrating an exemplary communication pattern based on the FlexRay (registered trademark) protocol.

FIG. 2 is a diagram illustrating an exemplary communication pattern based on the FlexRay (registered trademark) protocol. As shown in FIG. 2, according to the FlexRay (registered trademark) protocol, frames (message) are transmitted based on time slots into which a predetermined communication cycle is divided, and a transmission right in each time slot is provided based on the communication schedule. In FIG. 2, for example, a terminal A (for example, the node A11 shown in FIG. 1) has a frame transmission right at a slot ID of 1, a terminal B (for example, the node B12 shown in FIG. 1) has a frame transmission right at a slot ID of 2, a terminal C (for example, the node C13 shown in FIG. 1) has a frame transmission right at a slot ID of 3, and a terminal D (for example, the node D14 shown in FIG. 1) has a frame transmission right at a slot ID of 4.

Namely, in the data communication network system illustrated in FIG. 1, as shown in FIG. 2, the entire or a part of a time period corresponding to a predetermined communication cycle is set as a communication enabled period, and the communication enabled period is divided into a plurality of time frames. More specifically, in the data communication network system illustrated in FIG. 1, the node A11, the node B12, the node C13, and the node D14 are assigned individual frame IDs, respectively, so as to prevent the same IDs from being shared, when the system is designed. The time frames (corresponding to the slot IDs shown in FIG. 2) uniquely correspond to the frame IDs, respectively.

The node A11, the node B12, the node C13, and the node D14 need to establish temporal synchronization with each other and be integrated into a network in order to enable each of the node A11, the node B12, the node C13, and the node D14 to transmit a frame. In other words, when each of the nodes performs communication based on the communication cycle and the time slots, it is essential to establish the temporal synchronization. In the data communication network system based on the FlexRay (registered trademark) protocol, a time unique to each node is adjusted so as to be in synchronization with a common time used by the communication network, thereby establishing the temporal synchronization.

Next, a method for establishing the temporal synchronization, in the data communication network shown in FIG. 1, in the case of the communication protocol based on a time triggered communication procedure being used will be described. The data communication network system, illustrated in FIG. 1, in which the data communication based on the FlexRay (registered trademark) protocol is performed will be described as an example, by using the same network structure for simplification of description.

Figure 3:
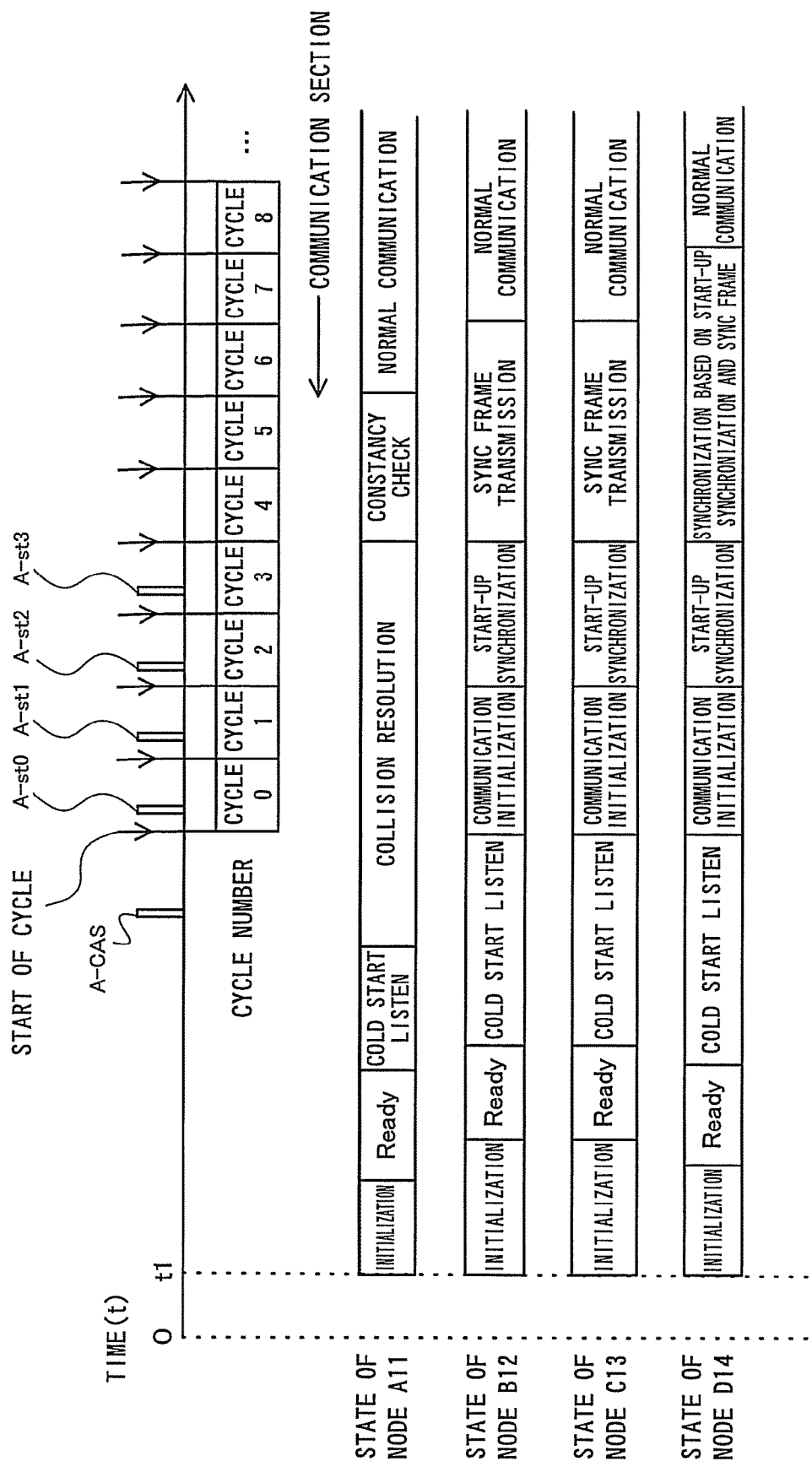
FIG. 3 is a timing chart of an exemplary communication cycle for establishing a network.

FIG. 3 is a timing chart showing an exemplary communication cycle in which the node A11, the node B12, the node C13, and the node D14 establish temporal synchronization, and a network is foamed. In FIG. 3, it is assumed that the node A11, the node B12, and the node C13 are each a cold start node, and the node D14 is a non-cold-start node.

Among the nodes set as the cold start nodes, a node which is able to synchronize its own unique time with a common time used by the communication network, and which is able to start the communication schedule based on the common time is particularly referred to as a preceding cold start node. Specifically, for example, in the data communication network illustrated in FIG. 1, when the node A11 acts as the preceding cold start node, the node B12 and the node C13 are each referred to as a following cold start node.

The following cold start node is a node which follows the preceding cold start node but can cooperate for temporal synchronization. On the other hand, the non-cold-start node (namely, the node D14 in the description of the present embodiment) is a node which follows temporal synchronization among the cold start nodes but cannot perform temporal synchronization by itself. Further, in the following description, the following cold start nodes and the non-cold-start node may be each referred to as an integrated node.

Firstly, as shown in FIG. 3, for example, when a vehicle is powered ON (for example, an ignition switch of a vehicle which has mounted therein the data communication network system illustrated in FIG. 1 is powered ON) at a time t1, each node performs an initialization process so as to be able to start communication. The node A11 corresponding to the preceding cold start node completes the initialization process, and enters a Ready state (a state in which shift to the cold start listening state is enabled).

The node A11 in the cold start listening state confirms that the other nodes are not performing communication, and enters the collision resolution state. Thereafter, the node A11 firstly transmits a CAS symbol (A-CAS shown in FIG. 3), and subsequently enters a communication cycle. At this time, the cycle number is 0, and the node A11 starts transmission of a start-up frame (A-st).

Specifically, the node A11 in the collision resolution state transmits the start-up frame (A-st) in a time slot defined in the communication schedule. On the other hand, the node B12, the node C13, and the node D14 each corresponding to the integrated node firstly observes the communication line in the communication cycle of an even number until the start-up frame is received. When the integrated nodes successfully receive the start-up frame (A-st0) in the communication cycle of the even number (that is, the cycle number 0), the time at which the start-up frame is received is calculated. When the integrated nodes receive the start-up frame (A-st1) in the subsequent communication cycle of an odd number (that is, the cycle number 1), each integrated node initializes its own unique time, and starts the communication schedule (which corresponds to the communication initialization shown in FIG. 3).

Further, in the subsequent communication cycles (that is, the cycle number 2, 3), the following cold start nodes (that is, the node B12, the node C13) each perform an initial clock adjustment based on a difference between a time at which the start-up frame (A-st2, A-st3) transmitted from the preceding cold start node (that is, the node A11) is received, and a predicted reception time calculated from the transmission schedule (which corresponds to the start-up synchronization shown in FIG. 3). Thereafter, in the subsequent communication cycles (that is, the cycle number 4, 5, 6), the following cold start nodes also transmit the start-up frames, which are not shown, and the preceding cold start node receives the start-up frames to perform temporal synchronization (which corresponds to the sync frame transmission and the constancy check shown in FIG. 3).

On the other hand, the non-cold-start node (the node D14) is integrated into the preceding cold start node and the following cold start nodes which are transmitting the start-up frames.

Thus, the preceding cold start node is allowed to set its own unique time as the common time used by the communication network, and the integrated nodes can perform temporal synchronization with the common time, and the transmission and reception are performed based on a common schedule. Namely, the preceding cold start node itself can determine a start point in the common time used by the communication network, and can start the communication schedule based on the common time.

The above description is a general description of the communication system on which the present embodiment is based.

Hereinafter, the data communication network system according to an embodiment of the present invention will be described with reference to the drawings.

Figure 4:
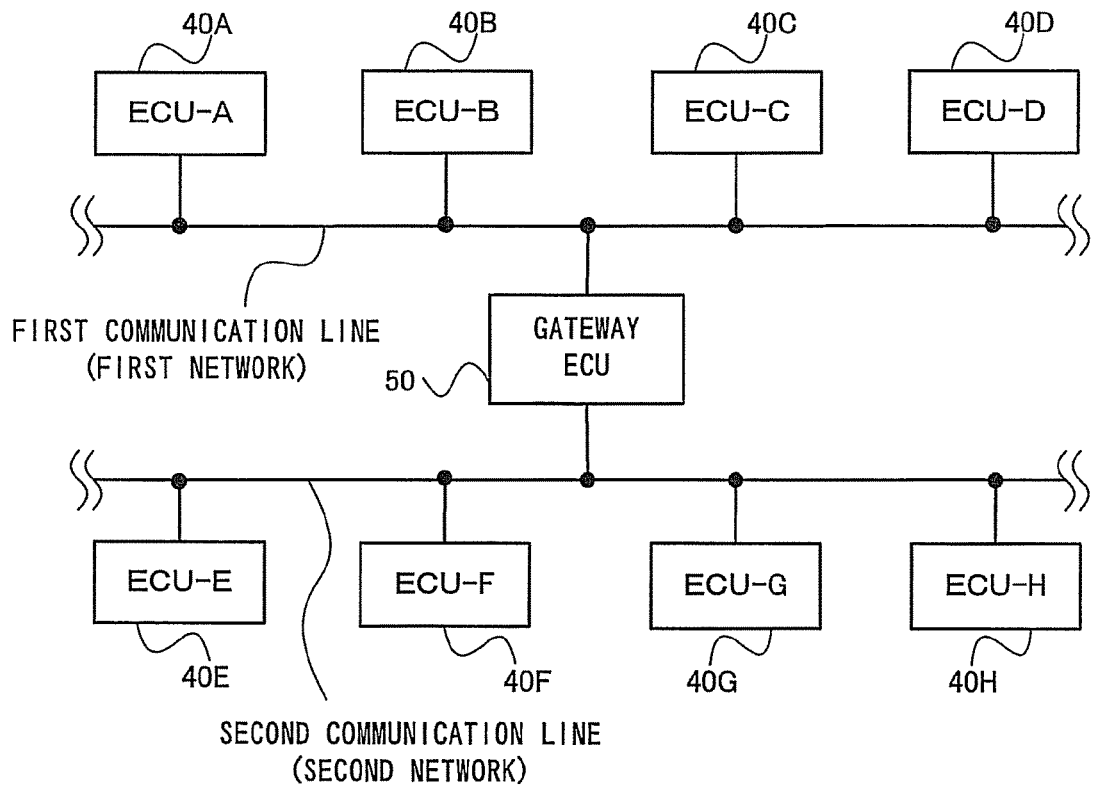
FIG. 4 is a block diagram illustrating an outline configuration of a data communication network system according to one embodiment.

FIG. 4 is a block diagram illustrating an outline configuration of the data communication network system according to the present embodiment. As shown in FIG. 4, the data communication network system according to the present embodiment includes: a first network in which an ECU-A (40A), an ECU-B (40B), an ECU-C (40C), an ECU-D (40D), and a gateway ECU 50 are connected to a first communication line; and a second network in which an ECU-E (40E), an ECU-F (40F), an ECU-G (40G), an ECU-H (40H), and the gateway ECU 50 are connected to a second communication line.

The gateway ECU (Gateway Electronic Control Unit) 50 shown in FIG. 4 is connected to each of the first communication line and the second communication line, and relays data between the first network and the second network. Specifically, the gateway ECU 50 is a network node for connecting, with each other, networks which use the same communication protocol or different communication protocols.

Further, in the data communication network system shown in FIG. 4, the ECU-A (40A), the ECU-B (40B), the ECU-C (40C), the ECU-D (40D), and the gateway ECU 50 each transmit and receive data, based on a time triggered communication protocol, in the first network. The FlexRay (registered trademark) protocol, which is an example of the time triggered communication protocol described above, is used for the first network.

For the second network shown in FIG. 4, the FlexRay (registered trademark) protocol, which is an example of the time triggered communication protocol described above, may be used. Alternatively, an event triggered communication protocol (for example, the CAN (Controller Area Network) protocol) based on which each ECU transmits and receives data at any time when transmission is required, may be used.

In the below description, it is assumed that, in the data communication network system shown in FIG. 4, a node which needs to determine a start point for the transmission schedule based on its own time is the gateway ECU 50. In this case, the gateway ECU 50 includes the control section as described above.

Figure 5:
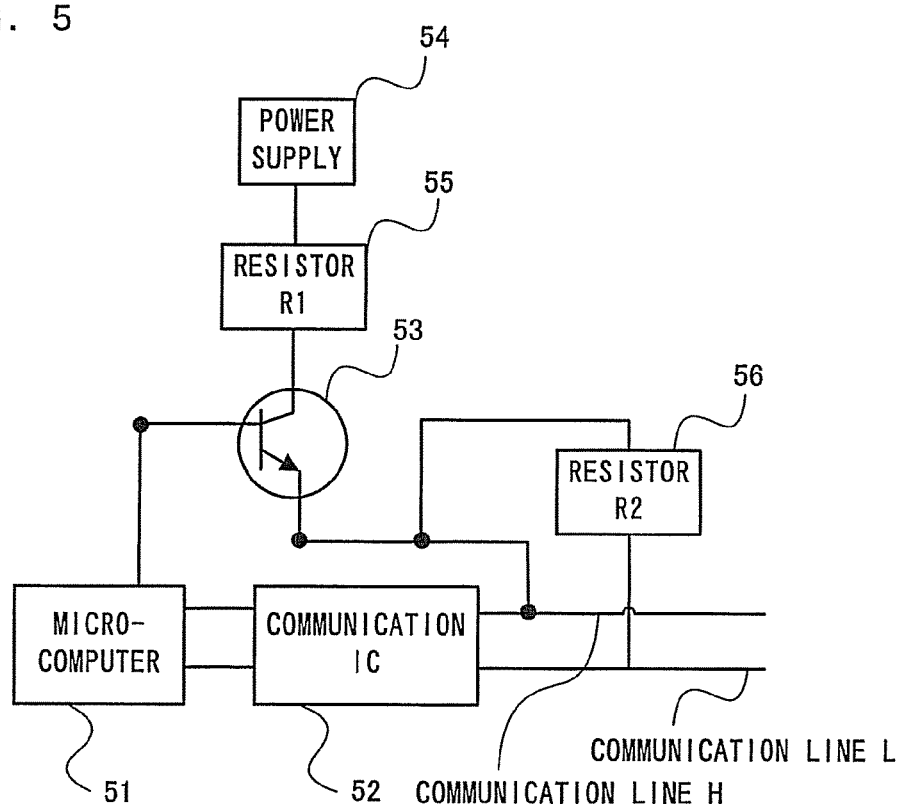
FIG. 5 is a block diagram illustrating an outline configuration of a data communication network according to the embodiment.

The control section included in the gateway ECU 50 will be described. FIG. 5 is a diagram illustrating an exemplary internal configuration of the gateway ECU 50. In FIG. 5, components which are not necessary for the description of the present embodiment are not shown.

As shown in FIG. 5, the gateway ECU 50 includes, in addition to a communication IC 52, a microcomputer 51, a transistor 53, a power supply 54, and the like. A resistor R1 (55), a resistor R2 (56), a capacitor (not shown), and the like may be provided for stabilizing voltages to be applied to a communication line H and a communication line L.

The microcomputer 51 determines a communication start and a communication end based on a communication protocol. Instead of the microcomputer 51, for example, a communication protocol controller and a dedicated device may be provided for determining the communication start and the communication end.

Further, the transistor 53, connected to the power supply 54, acts as a switching device for determining voltages to be applied to the communication line H and the communication line L. The switching may not be performed by using the transistor 53. For example, any device capable of switching application of voltages to the communication line H and the communication line L between for the communication start and for the communication end, may be used. Further, in an example shown in FIG. 5, although voltages applied to the communication line H and the communication line L are supplied by using the power supply 54, a power may be supplied from a voltage port (not shown) of the microcomputer 51 or a power supply IC (not shown).

As described above, the control section applies predetermined voltages to the communication lines H and L of the first communication line in accordance with an instruction from the microcomputer 51.

Figure 6:
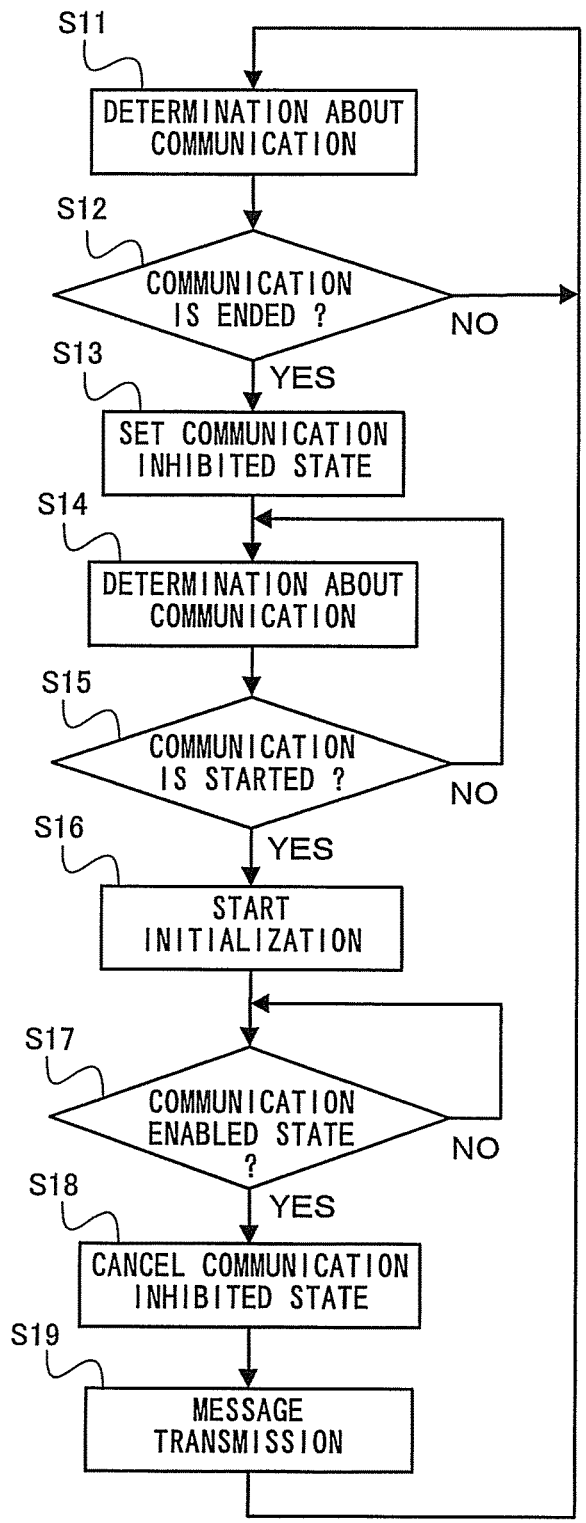
FIG. 6 is a flow chart showing an exemplary process executed by a microcomputer 51 in a communication inhibition section included in a gateway ECU 50.

Next, a process executed by the microcomputer 51 of the control section included in the gateway ECU 50 will be described with reference to a flow chart shown in FIG. 6. The process shown in the flow chart of FIG. 6 is repeated while a power is supplied to the gateway ECU 50. Specifically, for example, the process is automatically started when the data communication network system shown in FIG. 4 is established in a vehicle, and a power is supplied to the gateway ECU 50.

In step S11 shown in FIG. 6, the microcomputer 51 makes a determination about communication, and determines whether or not the communication is ended, in the subsequent step S12. Specifically, the microcomputer 51 determines whether or not each ECU connected to the first communication line shown in FIG. 4 ends the communication. When the determination of step S12 is affirmative (YES), the microcomputer 51 advances the process to the subsequent step S13.

On the other hand, when the determination of step S12 is negative (NO), the microcomputer 51 returns the process to step S11. For example, when an ignition switch of a vehicle is powered OFF in accordance with a driver of the vehicle performing a key operation, the determination of step S12 is affirmative.

In step S13, the microcomputer 51 puts the first communication line in the communication inhibited state. Specifically, the transistor 53 operates so as to apply voltages to the communication lines H and L of the first communication line so as to put the communication line H and the communication line L in the communication inhibited state. For example, in the case of the FlexRay (registered trademark), a voltage of 3.1V is applied to the communication line H, and a voltage of 1.9V is applied to the communication line L, to set a dominant voltage (the dominant voltage=the voltage of the communication line H−the voltage of the communication line L=1.2V). Thus, the dominant voltage continues to be applied to devices other than the gateway ECU 50, that is, the ECU-A (40A), the ECU-B (40B), the ECU-C (40C), and the ECU-D (40D). Thus, the ECU-A (40A), the ECU-B (40B), the ECU-C (40C), and the ECU-D (40D) cannot start the communication.

In step S14, the microcomputer 51 makes a determination about communication, and determines whether or not the communication is started, in the subsequent step S15. When the determination of step S15 is affirmative (YES), the microcomputer 51 advances the process to the subsequent step S16. On the other hand, when the determination of step S15 is negative (NO), the microcomputer 51 returns the process to step S14. For example, when the ignition switch of the vehicle is powered ON in accordance with the driver of the vehicle performing a key operation, the determination of step S15 is affirmative. At this time, the devices other than the gateway ECU 50, that is, the ECU-A (40A), the ECU-B (40B), the ECU-C (40C), and the ECU-D (40D), also determine that a state in which communication is started is entered because, for example, the ignition switch of the vehicle is powered ON in accordance with the driver of the vehicle performing the key operation.

For step S11 to step S15, a more specific case can be assumed and described. For example, a case where, after the vehicle is used by a driver, the vehicle is parked and the ignition switch is powered OFF (the determination of step S12 is YES), and thereafter the driver powers ON the ignition switch of the vehicle (the determination of step S15 is YES) in order to use the vehicle again, is assumed. That is, for example, until the ignition switch of the vehicle is powered ON again after the ignition switch thereof is powered OFF, the control section included in the gateway ECU 50 continues to apply voltages to the communication lines H and L of the first communication line so as to put the communication lines H and L in the communication inhibited state.

Returning to FIG. 6, when the gateway ECU 50, the ECU-A (40A), the ECU-B (40B), the ECU-C (40C), and the ECU-D (40D) determine, in step S15, that the communication is to be started, the gateway ECU 50, the ECU-A (40A), the ECU-B (40B), the ECU-C (40C), and the ECU-D (40D) each performs, in step S16, an initialization process so as to be able to start the communication.

The initialization process will be described by using, as an example, the timing chart of an exemplary communication cycle, as shown in FIG. 3, in which the network is formed. In the initialization process, for example, the gateway ECU 50, the ECU-A (40A), the ECU-B (40B), the ECU-C (40C), and the ECU-D (40D) each shift to the cold start listening state through the initialization.

As is apparent from the below description, at this time, the gateway ECU 50 needs to transmit a message for synchronization in communication with the devices other than the gateway ECU 50, that is, the ECU-A (40A), the ECU-B (40B), the ECU-C (40C), and the ECU-D (40D). Therefore, the gateway ECU 50 needs to complete the initialization process earlier than any of the devices other than the gateway ECU 50, that is, the ECU-A (40A), the ECU-B (40B), the ECU-C (40C), and the ECU-D (40D).

In step S17, the microcomputer 51 determines whether or not the gateway ECU 50 is in the communication enabled state, that is, whether or not the gateway ECU 50 has completed the initialization process. When the determination of step S17 is affirmative (YES), the microcomputer 51 advances the process to the subsequent step S18. On the other hand, when the determination of step S17 is negative (NO), the microcomputer 51 returns the process to step S17. That is, when the gateway ECU 50 has completed the initialization process and enters the communication enabled state, the determination of step S17 is affirmative (YES).

In step S18, the microcomputer 51 cancels the voltages which have been applied to the communication lines H and L of the first communication line for putting the communication line H and the communication line L in the communication inhibited state. Thereafter, in step S19, the gateway ECU 50 transmits a message for synchronization.

Thus, the gateway ECU 50 is able to start the communication at its intended time. That is, the gateway ECU 50 itself can determine the start point in the common time used by the communication network, and can start the communication schedule based on the common time. Hereinafter, more specific description will be given with reference to FIG. 7, FIG. 8, FIG. 9, and FIG. 3 and FIG. 4 which are referred to in the above description.

For example, in FIG. 4 referred to in the above description, the first network is formed by the ECU-A (40A), the ECU-B (40B), the ECU-C (40C), and the ECU-D (40D) being connected to the first communication line whereas the second network is formed by the ECU-E (40E), the ECU-F (40F), the ECU-G (40G), and the ECU-H (40H) being connected to the second communication line. It is assumed that the gateway ECU 50 is a gateway ECU which is connected to each of the first communication line and the second communication line, to relay data between the first network and the second network. Further, in each of the first network and the second network, data is transmitted and received based on the time triggered communication protocol (for example, the FlexRay (registered trademark) protocol).

Figure 7:
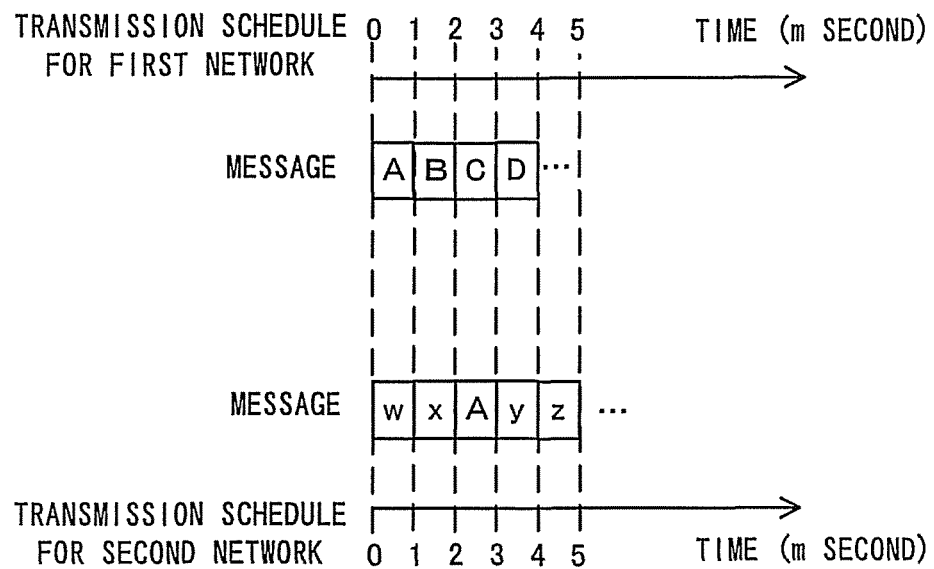
FIG. 7 is a diagram illustrating exemplary transmission schedules for a first network and a second network.

Next, a case in which a message is to be relayed by a gateway from the first network to the second network will be assumed and described. FIG. 7 is a diagram illustrating exemplary transmission schedules for the first network and the second network. For example, in FIG. 7, the gateway ECU 50 needs to relay a message "A" from the first network to the second network without retaining the message A in the gateway ECU 50.

However, as shown in FIG. 7, when the first network and the second network start the communication at the same time, the message "A" which is to be relayed by the gateway is retained in the gateway ECU 50 for 2 m seconds after the gateway ECU 50 receives the message "A", and thereafter the message "A" is transmitted to the second network.

Figure 8:
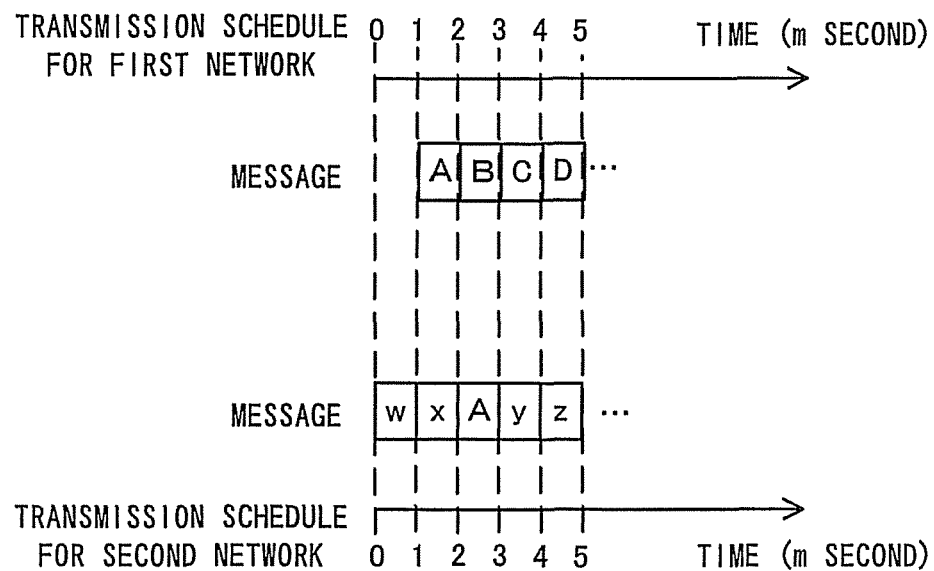
FIG. 8 is a diagram illustrating an exemplary case in which a start point for the transmission schedule of the first network and a start point for the transmission schedule for the second network are different from each other.

The gateway ECU 50 is notified of the transmission schedule of each of the first network and the second network. Therefore, as shown in FIG. 8, for example, the transmission start time of the first network may be delayed for 1 m second as compared to the transmission start time of the second network, in order to shorten a time period in which the message "A" is retained in the gateway ECU 50, instead of the first network and the second network starting the communication at the same time. Specifically, when the transmission start time of the first network is delayed for 2 m seconds as compared to the transmission start time of the second network, the gateway ECU 50 has to transmit the message "A" to the second network while receiving the message "A" from the first network. Therefore, for example, the transmission start time of the first network may be delayed for 1 m second as compared to the transmission start time of the second network.

Figure 9:
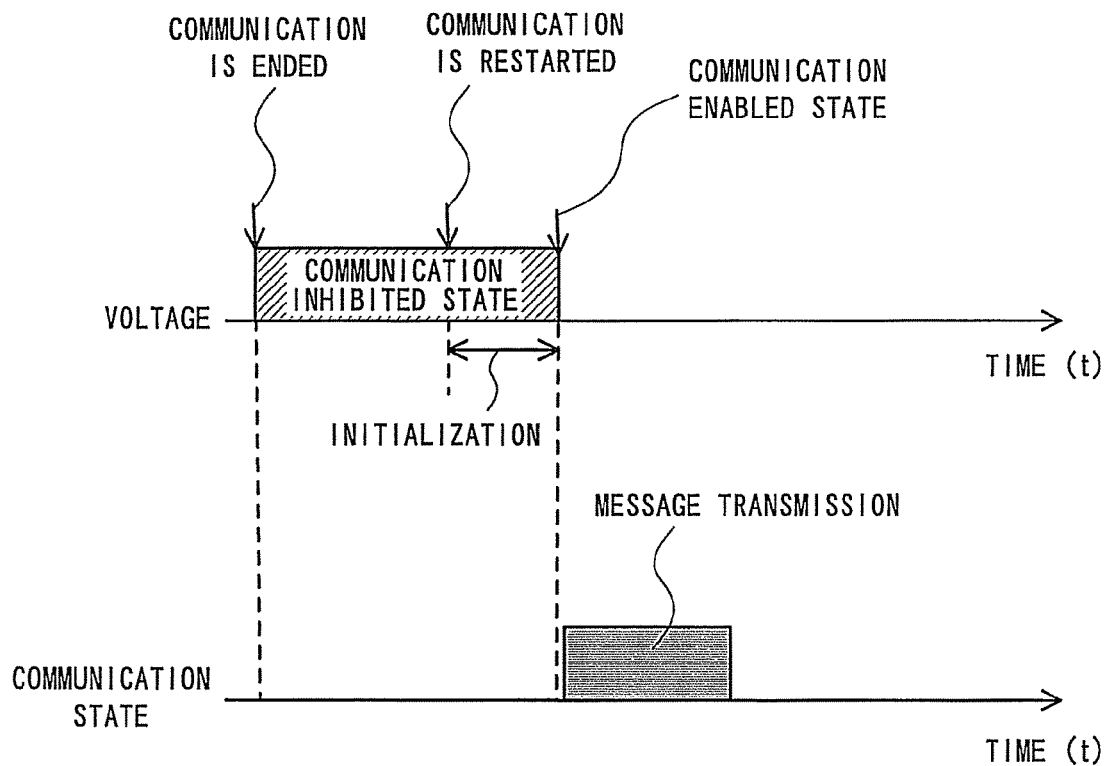
FIG. 9 is a diagram illustrating a time represented by the horizontal axis, and a voltage applied to communication lines H and L of a first communication line, and a state of the first network, the voltage and the state of the first network being represented by the vertical axis.

FIG. 9 is a diagram illustrating a time represented by a horizontal axis, and a voltage applied to the communication lines H and L of the first communication line, and a communication state of the first network, the voltage and the communication state being represented by the vertical axis. As indicated as "communication is ended" in FIG. 9, for example, the ECU-A (40A), the ECU-B (40B), the ECU-C (40C), and the ECU-D (40D) each connected to the first communication line end the communication (YES in step S12 shown in FIG. 6). The control section included in the gateway ECU 50 applies voltages to the communication lines H and L of the first communication line so as to put the communication lines H and L in the communication inhibited state (step S13 shown in FIG. 6).

As indicated as "communication is restarted" in FIG. 9, for example, a communication is started when the ignition switch of the vehicle is powered ON in accordance with a driver of the vehicle performing a key operation (YES in step S15 shown in FIG. 6). Also at this time, the control section continues to apply the voltages to the communication lines H and L of the first communication line for putting the communication lines H and L in the communication inhibited state.

Thereafter, when the gateway ECU 50 enters the communication enabled state, that is, when the gateway ECU 50 completes the initialization process, the control section cancels the voltages which have been applied to the communication lines H and L of the first communication line for putting the communication line H and the communication line L in the communication inhibited state, and the gateway ECU 50 simultaneously transmits a message for synchronization (step S18 and step S19 shown in FIG. 6).

Specifically, the message, which is transmitted by the gateway ECU 50 simultaneously when the voltages applied to the communication line H and the communication line L are cancelled, corresponds to a CAS symbol transmitted by the node A as shown in FIG. 3. That is, the CAS symbol is transmitted, and, in the subsequent cycle, the transmission of the start-up frame is started. When the other ECUs on the first network successfully receive the start-up frame, each of the other ECUs calculates the time at which the start-up frame is received, and initializes its own unique time, to start the communication schedule.

In other words, the preceding cold start node is a node which is allowed to determine the start point for the transmission schedule based on its own time. If a node needs to act as the preceding cold start node, the node has to become ready for transmission earliest and transmit the CAS symbol. Specifically, when the above-described conditions are satisfied, the node A corresponding to the preceding cold start node as illustrated in FIG. 3 corresponds to the gateway ECU 50.

As described above, a dominant voltage is set in the communication line H and the communication line L such that the devices other than the gateway ECU 50, that is, the ECU-A (40A), the ECU-B (40B), the ECU-C (40C), and the ECU-D (40D), are prevented from starting communication, and, when the gateway ECU 50 completes the initialization process, the voltages which have been applied to the communication line H and the communication line L are cancelled, and the CAS symbol is simultaneously transmitted. Thus, the gateway ECU 50 can act as the preceding cold start node capable of determining the start point for the schedule, and can determine the start point for a data transmission based on its intended time.

That is, for example, as shown in FIG. 8, the gateway ECU 50 can delay the time at which the communication of the first network is started, for 1 m second, as compared to the time at which the communication of the second network is started, so that the time period during which the message "A" is retained in the gateway ECU 50 can be shortened.

In the above description, it is assumed that the node which needs to determine the start point for the transmission schedule based on its own time is the gateway ECU 50. However, the present invention is not limited thereto. For example, the node which needs to determine the start point may be a suspension ECU, a brake ECU, an engine ECU, or the like. The suspension ECU will be described as an example. The suspension ECU controls an actuator mounted in a damper of a vehicle in accordance with a state of a road surface on which the vehicle is running, thereby controlling the damping force and the like. Further, the state of the road surface on which the vehicle is running constantly changes. Therefore, the suspension ECU needs to control the actuator so as to immediately respond to the state of the road surface on which the vehicle is running. That is, for example, when the suspension ECU includes the control section as described above, the suspension ECU can transmit data at its intended time, thereby controlling the actuator based on the data obtained immediately after calculation.

Figure 10:
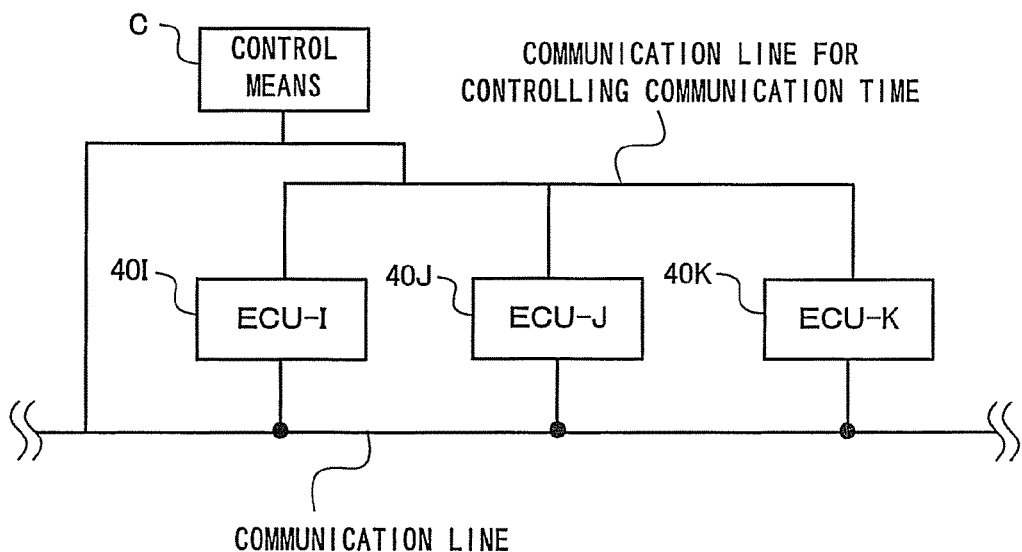
FIG. 10 is a block diagram illustrating an outline configuration of a data communication network system according to another embodiment.

Although, in the example described above, the node (the gateway ECU 50) which needs to determine the start point for the transmission schedule based on its own time includes the control section, control section C may be provided separately from a communication line for controlling a communication time, as shown in FIG. 10.

Further, software may be used to put all the ECUs (for example, the node A11, the node B12, the node C13, and the node D14 in the example shown in FIG. 1) in the communication inhibited state at the end of communication. However, in this case, when the communication needs to be started, software for canceling the communication inhibited state is used for canceling the communication inhibited state in only the ECU (for example, the node A11 in the example shown in FIG. 1) which needs to control the communication time. In each of the other ECUs (for example, the node B12, the node C13, and the node D14 in the example shown in FIG. 1), the communication inhibited state is canceled in accordance with a communication inhibited state cancellation instruction (for example, change in voltage in the communication line) from the ECU for controlling the communication time. Instead of the method in which change in voltage in the communication line as described above is recognized, a method in which an instruction is issued by using the communication line for controlling the communication time, as shown in FIG. 10, may be used as the communication start method.

Alternatively, for example, the ECU (for example, the node A11 in the example shown in FIG. 1) which needs to control the communication time at the start of the communication may include a communication inhibited state cancellation timer, in which the communication inhibited state cancellation time is set on software so as to be earlier than that of each of the other ECUs (for example, the node B12, the node C13, and the node D14 in the example shown in FIG. 1). Specifically, each of the other ECUs also includes the communication inhibited state cancellation timer in which the communication inhibition cancellation time is set so as to be later than that of the ECU which needs to control the communication time. When the ECU which needs to control the communication time cannot issue an instruction for communication start for some reason (for example, occurrence of an error), the other ECUs may perform communication based on the communication protocol after the time set in the timer of each ECU has elapsed.

While the invention has been described in detail, the foregoing description is in all aspects illustrative and not restrictive. It is understood that numerous other modifications and variations can be devised without departing from the scope of the invention.

INDUSTRIAL APPLICABILITY

The data communication network system according to the present invention is useful as, for example, a data communication network system which is mounted in, for example, a vehicle, and enables an intended unit to determine a start point for a transmission schedule of a communication.

DESCRIPTION OF THE REFERENCE CHARACTERS

40A . . . ECU-A
40B . . . ECU-B
40C . . . ECU-C
40D . . . ECU-D
50 . . . gateway ECU

The invention claimed is:

1. A data communication network system in which a plurality of electronic control units perform network communication through a network communication line based on a time triggered communication protocol, the data communication network system comprising
    a control section configured to apply the time triggered communication protocol in order to place the network communication line in a communication inhibited state, and to cancel the communication inhibited state at a predetermined time, wherein
    a predetermined one unit among the plurality of electronic control units transmits a message for synchronization, in a communication time, with the other units among the plurality of electronic control units immediately after the communication inhibited state is cancelled,
    wherein the electronic control units are temporally synchronized with respect to each other.

2. The data communication network system according to claim 1, wherein the control mean puts the network communication line in the communication inhibited state when the plurality of electronic control units end communication.

3. The data communication network system according to claim 1, wherein the control section is mounted in the predetermined one unit among the plurality of electronic control units.

4. A data communication network system in which a plurality of electronic control units perform network communication through a network communication line based on a time triggered communication protocol, the data communication network system comprising:
    a control section for previously putting the network communication line in a communication inhibited state, and canceling the communication inhibited state at a predetermined time, wherein a predetermined one unit among the plurality of electronic control units transmits a message for synchronization, in a communication time, with the other units among the plurality of electronic control units immediately after the communication inhibited state is cancelled, and wherein the network communication line is connected to another network communication line via a gateway, and the control section cancels the communication inhibited state based on a transmission and reception cycle defined for the another network communication.

5. A data communication network system in which a plurality of electronic control units perform network communication through a network communication line based on a time triggered communication protocol, the data communication network system comprising:

a control section for previously putting the network communication line in a communication inhibited state, and canceling the communication inhibited state at a predetermined time, wherein a predetermined one unit among the plurality of electronic control units transmits a message for synchronization, in a communication time, with the other units among the plurality of electronic control units immediately after the communication inhibited state is cancelled, and wherein the control section sets the communication inhibited state by applying a predetermined voltage to the network communication line.

* * * * *